United States Patent
Cheng et al.

(10) Patent No.: US 12,016,354 B2
(45) Date of Patent: Jun. 25, 2024

(54) FERMENTED BEVERAGE AND PREPARATION METHOD THEREOF

(71) Applicants: Shandong Feilong Food Co., Ltd., Zibo (CN); Jiangnan University, Wuxi (CN)

(72) Inventors: Yuliang Cheng, Wuxi (CN); Lin Xu, Wuxi (CN); Shengnan Liu, Wuxi (CN); Chengsheng Wang, Zibo (CN); Fuwei Pi, Wuxi (CN); Yue Wang, Wuxi (CN); Yahui Guo, Wuxi (CN); Hang Yu, Wuxi (CN); Yunfei Xie, Wuxi (CN); Weirong Yao, Wuxi (CN); He Qian, Wuxi (CN)

(73) Assignees: Shandong Feilong Food Co., Ltd., Zibo (CN); Jiangnan University, Wuxi (CN)

( * ) Notice: Subject to any disclaimer, the term of this patent is extended or adjusted under 35 U.S.C. 154(b) by 517 days.

(21) Appl. No.: 17/294,426

(22) PCT Filed: Oct. 22, 2020

(86) PCT No.: PCT/CN2020/122747
§ 371 (c)(1),
(2) Date: May 17, 2021

(87) PCT Pub. No.: WO2021/135539
PCT Pub. Date: Jul. 8, 2021

(65) Prior Publication Data
US 2022/0304339 A1    Sep. 29, 2022

(30) Foreign Application Priority Data
Dec. 30, 2019 (CN) .......................... 201911398614.9

(51) Int. Cl.
*A23L 2/02* (2006.01)
*A23L 2/38* (2021.01)

(52) U.S. Cl.
CPC ................ *A23L 2/382* (2013.01); *A23L 2/02* (2013.01)

(58) Field of Classification Search
CPC .................................. A23L 2/02; A23L 2/382
See application file for complete search history.

(56) References Cited

U.S. PATENT DOCUMENTS

2003/0235559 A1* 12/2003 Sobol .................. A61K 35/747
435/252.4
2008/0206403 A1* 8/2008 Beverini .................. A23L 2/02
426/51

FOREIGN PATENT DOCUMENTS

| CN | 103284243 B | 1/2015 |
|---|---|---|
| CN | 104382147 A | 3/2015 |
| CN | 105077464 A | 11/2015 |
| CN | 105995710 A | 10/2016 |
| CN | 106261363 A | 1/2017 |
| CN | 107889994 A | 4/2018 |
| CN | 111084310 A | 5/2020 |

OTHER PUBLICATIONS

Bioprocessing, "Fermentation". Available online as of Jun. 8, 2017 from http://bioprocessing.weebly.com. pp. 1-4. (Year: 2017).*
Hao Yu-Jie, et al., Changes of physical and chemical properties and bioactive substances during the noni temperature-controlled fermentation, Food and Fermentation Industries, 2018, pp. 105-109, 44(9).
GB4789.35-2016, Detection of food microorganisms—lactic acid bacteria, China National Food Safety Standard.
GBT 15038-2006, General analysis principles of port wine and fruit wine, China National Food Safety Standard.

* cited by examiner

*Primary Examiner* — Jenna A Watts
(74) *Attorney, Agent, or Firm* — Bayramoglu Law Offices LLC

(57) ABSTRACT

A fermented beverage and a preparation method are disclosed. The method uses ripened fruits and/or vegetables as raw materials. The method includes performing a natural ripening on a fruit and/or a vegetable at 15° C. to 30° C. for 5 days to 10 days to obtain a ripened fruit and/or vegetable; and inoculating lactic acid bacteria into the ripened fruit and/or vegetable, and performing a fermentation for 10 days to 30 days at 15° C. to 30° C. to obtain the fermented beverage. After 23 days of fermentation, the fermented beverage has a total flavonoid content up to 0.5 mg/mL to 2.0 mg/mL, which is beneficial to human health, a pH of 3.2 to 3.8 and a total titratable acidity of up to 12 mg/mL to 18 mg/mL. The fermented beverage requires a short fermentation cycle, which is beneficial to industrial production.

20 Claims, 2 Drawing Sheets

FERMENTED BEVERAGE AND PREPARATION METHOD THEREOF

CROSS REFERENCE TO THE RELATED APPLICATIONS

This application is the national phase entry of International Application No. PCT/CN2020/122747, filed on Oct. 22, 2020, which is based upon and claims priority to Chinese Patent Application No. 201911398614.9, filed on Dec. 30, 2019, the entire contents of which are incorporated herein by reference.

TECHNICAL FIELD

The present invention belongs to the fields of fermentation technology and biotechnology, and particularly to a fermented beverage and a preparation method thereof.

BACKGROUND

A fruit and vegetable fermented beverage is a mixed fermentation broth produced by adding a fermentative strain to fresh fruits and/or vegetables, which are rich in biologically active and nutritional elements, including sugars, organic acids, minerals, vitamins, phenols, and terpenoids, some important enzymes, and the like. The fermented beverage appeals to consumers for balancing the endocrine system, anti-inflammation and anti-bacteria, enhancing human immunity, purifying blood, maintaining a normal bodily pH, and protecting and balancing the intestinal tract.

Lactic acid bacteria, a kind of probiotics, can decompose carbohydrates into lactic acids, thereby alleviating lactose intolerance, which maintains an intestinal environment at acidic conditions. The acidic conditions can promote the growth and reproduction of *Lactobacillus plantarum* (*L. plantarum*) and also inhibit the survival of harmful bacteria, which is conducive to the balance of intestinal microbes. In addition, lactic acid bacteria can produce unique lactobacillin during the reproduction, which is a biological preservative that can well extend a shelf life of a product. Therefore, lactic acid bacteria are widely used in the field of food preservation.

There were reports of use of lactic acid bacteria as a fermentative strain for the preparation of fruit and vegetable fermented beverages. However, existing methods for using lactic acid bacteria as a fermentative strain to prepare fruit and vegetable fermented beverages still have disadvantages. For example, Chinese patent No. CN106261363A, issued to Liu Wenmei et al., discloses a fruit and vegetable fermented beverage prepared by inoculating *L. plantarum* into a fruit and vegetable juice for fermentation. However, 10 days of fermentation yields only an *L. plantarum* content of $10^6$ colony forming units/mL (CFU/mL) in the fruit and vegetable fermented beverage, with an excessively low viable bacterium content.

Chinese patent No. CN103284243B, issued to Shi Jie, et al., discloses a fruit and vegetable fermented beverage prepared by inoculating *L. plantarum* into a fruit and vegetable juice for fermentation. However, due to the addition of other additives and a sterilization process, nutritional components in the obtained fruit and vegetable fermented beverage are damaged and lack their beneficial qualities.

Chinese patent No. CN107889994A, issued to Lin Yong et al., discloses a fruit and vegetable fermented beverage prepared by inoculating *L. plantarum* V2.0 into a carrot juice for fermentation. However, because raw materials need to be steamed in high-pressure steam at 115° C. to 121° C., the obtained fruit and vegetable fermented beverage has a poor taste.

There were reports of the preparation of fruit and vegetable fermented beverages through natural fermentation. According to the reports, there is no need to sterilize raw materials, thus the nutritional components in the raw materials can be maximally retained. However, existing methods for preparing fruit and vegetable fermented beverages through natural fermentation also have disadvantages. For example, "Changes of physical and chemical properties and bioactive substances during the noni temperature-controlled fermentation", Hao Yujie, et al., describes a fruit and vegetable fermented beverage prepared by natural fermentation. However, three months of fermentation is required to allow a pH of 3.6 for the fruit and vegetable fermented beverage, which is an excessively long fermentation cycle.

Therefore, it is highly desirable to provide a method for preparing a fruit and vegetable fermented beverage that has high contents of viable lactic acid bacteria and active ingredients, a prominent flavor, as well as a short fermentation cycle.

SUMMARY

Technical Problem

A technical problem to be solved by the present invention is to provide a method for preparing a fruit and vegetable fermented beverage that has high contents of viable *L. plantarum* and active ingredients, a prominent flavor, as well as a short fermentation cycle.

Technical Solution

In order to solve the above technical problem, the present invention provides a method for preparing a fermented beverage, including: performing a natural ripening on a fruit and/or a vegetable at 15° C. to 30° C. for 5 days to 10 days to obtain a ripened fruit and/or vegetable; and inoculating lactic acid bacteria into the ripened fruit and/or vegetable, and performing a fermentation at 15° C. to 30° C. for 10 days to 30 days to obtain the fermented beverage.

In an embodiment of the present invention, the method may include: performing a natural ripening on a fruit and/or a vegetable at 15° C. to 30° C. for 5 days to 10 days to obtain a ripened fruit and/or a vegetable; beating and homogenizing the ripened fruit and/or vegetable to obtain a ripened fruit and/or vegetable puree; inoculating lactic acid bacteria into the ripened fruit and/or vegetable puree, and performing a fermentation at 15° C. to 30° C. for 10 days to 30 days to obtain a fermented fruit and/or vegetable puree; and centrifuging the fermented fruit and/or vegetable puree to obtain a supernatant, namely, the fermented beverage.

In an embodiment of the present invention, the method may include: performing a natural ripening on a fruit and/or a vegetable at 25° C. for 5 days to 10 days to obtain a ripened fruit and/or vegetable; beating and homogenizing the ripened fruit and/or vegetable to obtain a ripened fruit and/or vegetable puree; inoculating lactic acid bacteria into the ripened fruit and/or vegetable puree, and performing a fermentation at 25° C. for 10 days to 30 days to obtain a fermented fruit and/or vegetable puree; and centrifuging the fermented fruit and/or vegetable puree to obtain a supernatant, namely, the fermented beverage.

In an embodiment of the present invention, the lactic acid bacteria may be inoculated into the ripened fruit and/or vegetable puree at an amount of $1\times10^5$ CFU/mL to $1\times10^6$ CFU/mL.

In an embodiment of the present invention, the natural ripening may be conducted in an aseptic and airtight environment.

In an embodiment of the present invention, the fermentation may be conducted in an aseptic and airtight environment.

In an embodiment of the present invention, the beating and homogenizing may be conducted in an aseptic environment.

In an embodiment of the present invention, the fruit and/or vegetable may not be crushed and/or sterilized.

In an embodiment of the present invention, the lactic acid bacteria may be *L. plantarum*.

In an embodiment of the present invention, the fruit may be red raspberry, noni, blackberry, fig, and/or papaya.

In an embodiment of the present invention, the vegetable may be green radish, white radish, bamboo shoot, tomato, and/or Jerusalem artichoke.

The present invention also provides a fermented beverage prepared using the method described above.

The present invention also provides a food including the fermented beverage described above.

In an embodiment of the present invention, the food includes the fermented beverage and a food additive.

Advantages (1) The present invention provides a method for preparing a fermented beverage using fruits and/or vegetables as raw materials. In this method, after 23 days of fermentation, the fermented beverage has a pH of 3.2 to 3.8 and a total titratable acidity up to 12 mg/mL to 18 mg/mL. Obviously, the fermented beverage prepared according to the present invention requires a short fermentation cycle and is beneficial to industrial production.

(2) The present invention provides a method for preparing a fermented beverage using fruits and/or vegetables as raw materials. In this method, after 23 days of fermentation, the fermented beverage has a total flavonoid content up to 0.5 mg/mL to 2.0 mg/mL. Obviously, the fermented beverage prepared according to the present invention has high contents of active ingredients such as flavonoids and is beneficial to human health.

(3) The present invention provides a method for preparing a fermented beverage using fruits and/or vegetables as raw materials. In this method, after 23 days of fermentation, the fermented beverage has a total antioxidant capacity (T-AOC) as high as 1 mM to 3 mM, a diphenylpicrylhydrazyl (DPPH) free radical scavenging activity as high as 60% to 95%, and a hydroxyl free radical scavenging activity as high as 60% to 95%. Obviously, the fermented beverage prepared according to the present invention has strong antioxidant ability and is beneficial to human health.

(4) The present invention provides a method for preparing a fermented beverage using fruits and/or vegetables as raw materials. In this method, after 23 days of fermentation, the fermented beverage has a viable *L. plantarum* content as high as $1\times10^8$ CFU/mL to $1\times10^9$ CFU/mL. Obviously, the fermented beverage prepared according to the present invention has a high viable *L. plantarum* content and is beneficial to human health.

(5) The present invention provides a method for preparing a fermented beverage using fruits and/or vegetables as raw materials. The fermented beverage prepared according to the present invention has a significantly-reduced content of caprylic acid, caproic acid, and other volatile components that can cause an undesirable flavor, and a significantly-increased content of linalool, ethyl hexanoate, and other volatile components that can bring fragrance. Obviously, the fermented beverage has an enjoyable taste and is easily favored by consumers.

Figure 1:
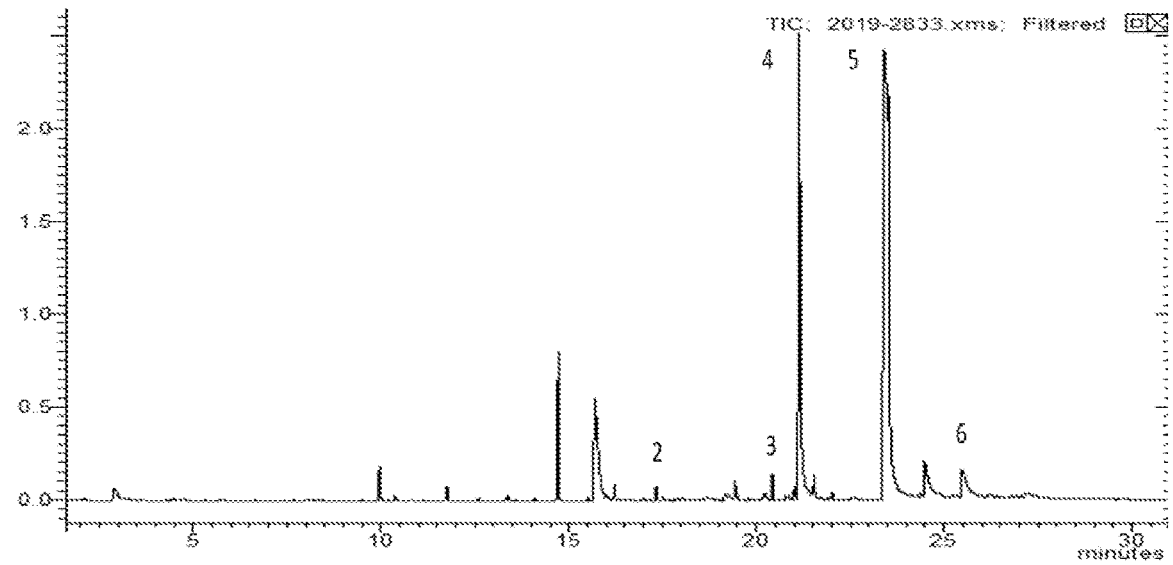
FIG. 1 is a diagram showing the analysis results of volatile components in a noni juice in Example 1.
Figure 2:
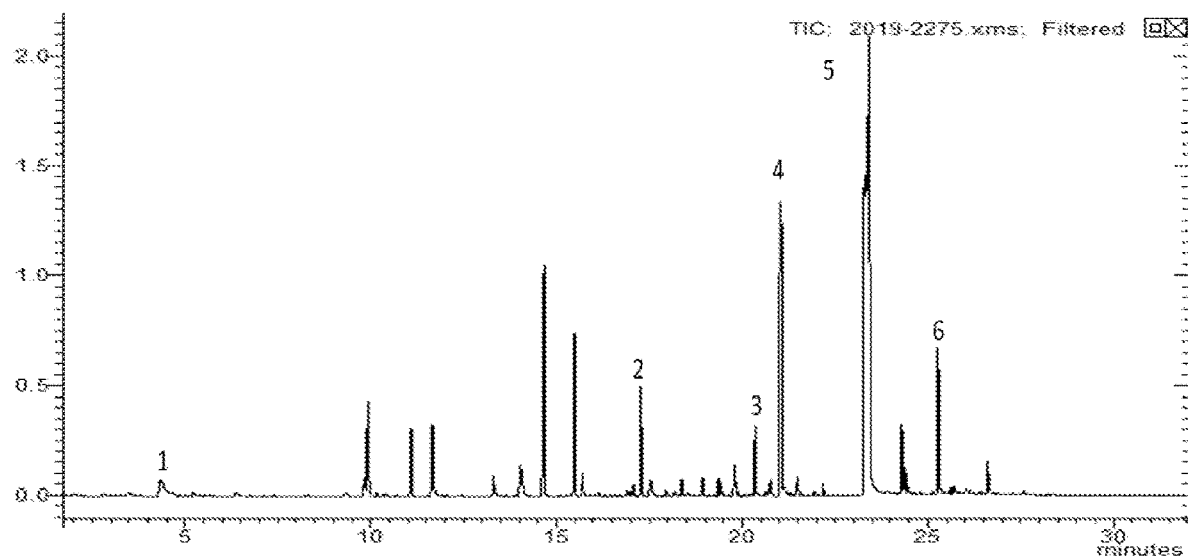
FIG. 2 is a diagram showing the analysis results of volatile components in a ripened noni juice in Example 1.
Figure 3:
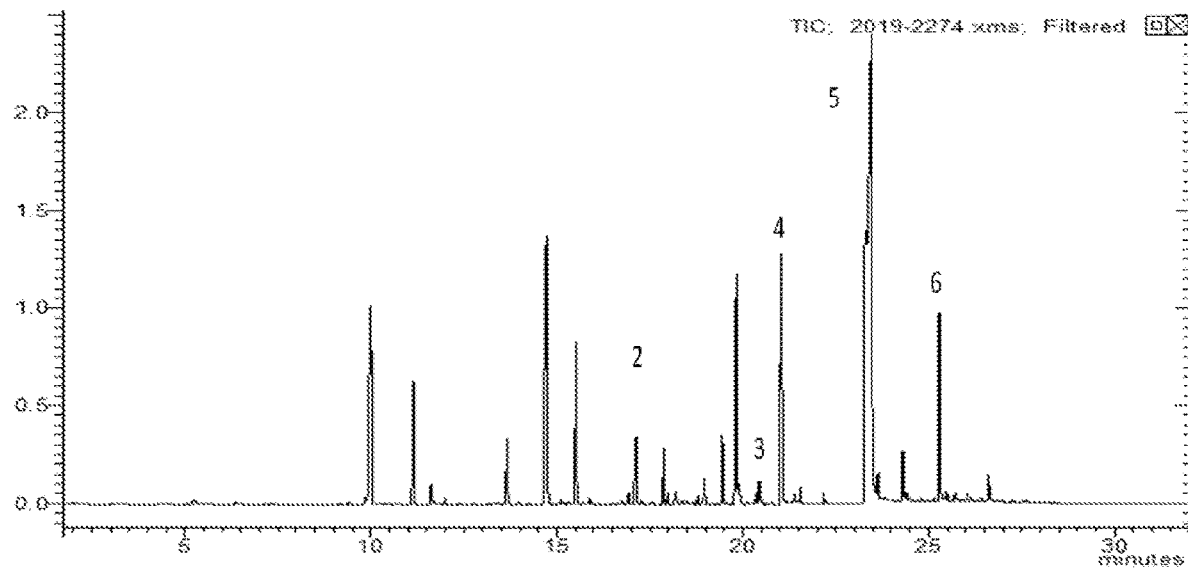
FIG. 3 is a diagram showing the analysis results of volatile components in a fermented noni juice in Example 1.
Figure 4:
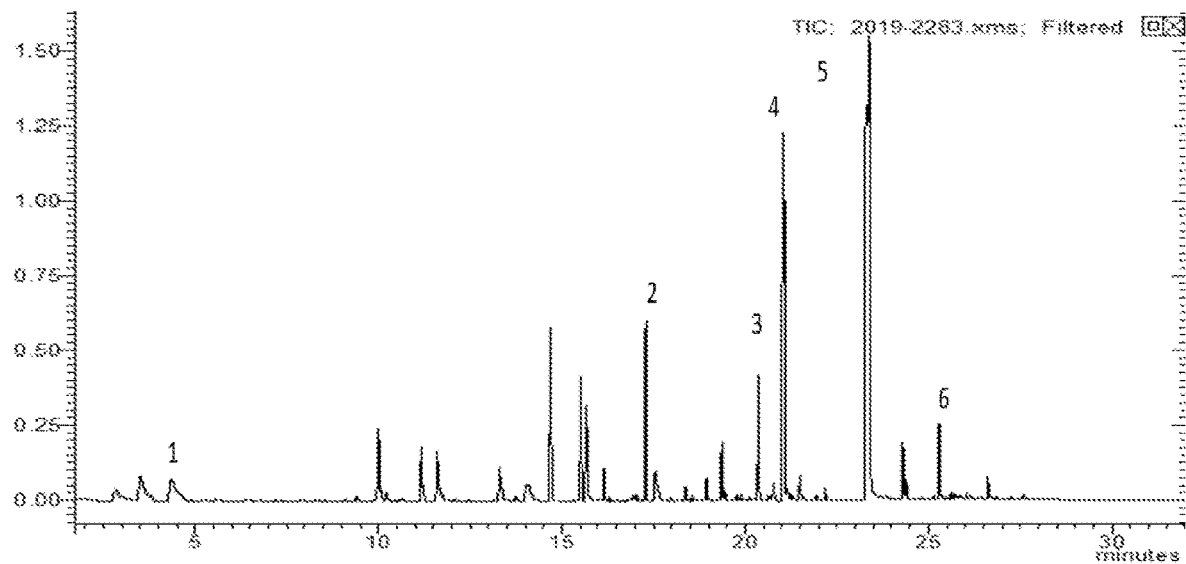
FIG. 4 is a diagram showing the analysis results of volatile components in a fermented noni beverage in Example 1.

In FIG. 1 to FIG. 4, 1 represents ethyl lactate; 2 represents linalool; 3 represents methyl salicylate; 4 represents caproic acid; 5 represents caprylic acid; and 6 represents capric acid.

DETAILED DESCRIPTION OF THE EMBODIMENTS

The noni involved in the following examples was purchased from Wuxi Nuoyuan Biotechnology Co., Ltd.; the red raspberry involved in the following examples was purchased from Liaoning Red Raspberry Industry Co., Ltd; the green radish involved in the following examples was purchased from Weifang, Shandong; and the *L. plantarum* 22703 involved in the following examples was purchased from China Center of Industrial Culture Collection (CICC), with a product No.: CICC 22703.

Detection Methods Involved in the Following Examples are as Follows:

A detection method for viable count refers to "*Detection of food microorganisms—lactic acid bacteria*" (GB4789.35-2016) of China National Food Safety Standard.

A detection method for pH and total acid content refers to the "*General analysis principles of port wine and fruit wine*" (GBT 15038-2006) of China National Food Safety Standard.

A detection method for total flavonoid content: the $NaNO_2$—$Al(NO_3)_3$ colorimetric method is used to determine a total flavonoid content in fermented beverages: with a rutin concentration as x-coordinate (x) and an absorbance at 510 nm as y-coordinate (y), a rutin standard curve is plotted; a standard linear regression equation for rutin is as follows: y=0.0033x+0.0484, with a correlation coefficient of $R^2$=0.999; and a total flavonoid content in a fermented beverage is calculated according to the standard linear regression equation for rutin.

A detection method for T-AOC: a T-AOC test kit (colorimetry) is used for determination.

A detection method for DPPH free radical scavenging activity: 0.0100 g of DPPH free radical is accurately weighed and added to a 100 mL brown volumetric flask, dissolved with 80% ethanol, and diluted to 100 mL; 0.1 mL of a fermented beverage is taken and thoroughly mixed with 9.9 mL of phosphate buffer solution (PBS) (0.2 mol/L, pH 6.6) to obtain a test solution; then 2 mL of a 80% (v/v) ethanol solution and 2 mL of the test solution are taken, and 2 mL of the DPPH solution is added to each of the two, respectively; another 2 mL of the test solution is taken and thoroughly mixed with another 2 mL of the 80% (v/v) ethanol solution, and a resulting mixture reacts for 30 min at room temperature in the dark; absorbance values are determined at 517 nm to obtain A0, A1, and A2, correspondingly; and the DPPH free radical scavenging activity is calculated as follows: DPPH free radical scavenging activity (I %)=[1−(A1−A2)/A0]×100%.

A detection method for hydroxyl free radical scavenging activity: 1 mL of a fermented beverage is taken and thoroughly mixed with 4 mL of PBS (0.2 mol/L, pH 6.6) to obtain a test solution; then three test tubes are taken, and 1 mL of the PBS is added to one of the three test tubes and 1 mL of the test solution is added to each of the remaining two, respectively; then 1 mL of a 3 mmol/L ferrous sulfate solution and 1 mL of 3 mmol/L salicylic acid-ethanol solution are added to each of the three test tubes, respectively, and finally 1 mL of 3 mmol/L $H_2O_2$ is added to each of the former two test tubes respectively for reaction and 1 mL of purified water is added to the remaining one; resulting mixtures are thoroughly mixed and react for 30 min in a 37° C. water bath; absorbance values are determined at 510 nm to obtain A0, A1, and A2, correspondingly; and the hydroxyl free radical scavenging activity is calculated as follows: hydroxyl free radical scavenging activity (I %)=[1−(A1−A2)/A0]×100%.

A detection method for volatile component content: gas chromatography-mass spectrometry (GC-MS) is used for detection: 5.0 mL of a fermented beverage is taken as a sample and added to a 20 mL headspace bottle, and an aged 50/30 μm CAR/PDMS/DVB extraction head is inserted into the headspace of the sample bottle for adsorption at 50° C. for 30 min; then the adsorbing extraction head is taken out and inserted into a GC inlet for desorption at 250° C. for 3 min, and the instrument is started to acquire data at the same time; compound search results are aligned with a National Institute of Standards and Technology (NIST) standard spectrum library, and if a similarity reaches more than 80%, and it is confirmed as a target compound; and the area normalization method is used to express a content of each volatile component, namely, semi-quantitative analysis.

A Medium Involved in the Following Examples is as Follows:

MRS medium (based on a volume of 1 L): 20 g of glucose, 10 g of beef extract, 5 g of anhydrous sodium acetate, 5 g of yeast powder, 10 g of tryptone, 0.1 g of magnesium sulfate heptahydrate, 0.05 g of manganese sulfate monohydrate, 2.6 g of dipotassium hydrogen phosphate trihydrate, 2 g of diammonium hydrogen citrate, and 1 mL of Tween. The obtained MRS medium has a pH of 6.2 to 6.4 and is sterilized at 115° C. for 20 min.

A Preparation Method Involved in the Following Examples is as Follows:

A preparation method of an *L. plantarum* 22703 bacterial solution: 100 μL of *L. plantarum* 22703 bacterial liquid is pipetted from a glycerin preservation tube, inoculated into 5 mL of the MRS medium, and cultivated at 37° C. for 10 h to 24 h for activation; and the above activation operation is repeated 3 times to obtain an activated *L. plantarum* 22703 bacterial solution.

Example 1: Preparation of a Fermented Noni Beverage

Solution 1: Fresh and undamaged noni is taken and washed until the surface is clean, air-dried, and squeezed with a juicer to obtain a noni juice.

Solution 2: Fresh and undamaged noni is taken and washed until the surface is clean, air-dried, and immediately put in a sealed aseptic glass jar; natural ripening is conducted at 25° C. for 7 days to obtain ripened noni; and the ripened noni is squeezed with a juicer to obtain a ripened noni juice.

Solution 3: Fresh and undamaged noni is taken and washed until the surface is clean, air-dried, and squeezed with a juicer to obtain a noni juice; the *L. plantarum* 22703 bacterial solution is inoculated into the noni juice at an inoculation amount of 2.5% (v/v); and fermentation is conducted at 25° C. for 16 days under aseptic conditions to obtain a fermented noni juice.

Solution 4: Fresh and undamaged noni is taken and washed until the surface is clean, air-dried, and immediately put into a sealed aseptic glass jar, and natural ripening is conducted at 25° C. for 7 days to obtain ripened noni; the ripened noni is put into an aseptic bag, and a beating machine is used to beat and homogenize the ripened noni to obtain a ripened noni puree; the *L. plantarum* 22703 bacterial solution is inoculated into the ripened noni puree at an inoculation amount of 2.5% (v/v), and fermentation is conducted at 25° C. for 16 days under aseptic conditions to obtain a fermented noni puree; and the fermented noni puree is centrifuged at 3,000 r/min until a clear supernatant is obtained, namely, a fermented noni beverage.

The pH, total acid content, total flavonoid content, antioxidant capacity (AOC) (T-AOC, DPPH free radical scavenging activity, and hydroxyl free radical scavenging activity), and lactic acid bacterium content are detected for the noni juice, ripened noni juice, fermented noni juice, and fermented noni beverage (detection results are shown in Table 1), and the types and contents are analyzed for volatile components in the noni juice, ripened noni juice, fermented noni juice, and fermented noni beverage (detection results are shown in FIG. 1 to FIG. 4).

It can be seen from Table 1 that the fermented noni beverage has a pH of 3.50±0.058, which is reduced by 17%, 10%, and 3% than that of the noni juice, ripened noni juice, and fermented noni juice, respectively; and the fermented noni beverage has a total acid content of 15.39±0.383 mg/mL, which is increased by 93%, 67%, and 48% than that of the noni juice, ripened noni juice, and fermented noni juice, respectively. It shows that natural ripening+*L. plantarum* fermentation greatly shortens a fermentation cycle for the fermented noni beverage.

It can be seen from Table 1 that the fermented noni beverage has a total flavonoid content of 0.54±0.027 mg/mL, which is reduced by 200%, 38%, and 32% than that of the noni juice, ripened noni juice, and fermented noni juice, respectively. It shows that natural ripening+*L. plantarum* fermentation greatly improves the contents of active ingredients in the fermented noni beverage.

It can be seen from Table 1 that the fermented noni beverage has a T-AOC of 1.82±0.136 mM, which is increased by 48%, 67%, and 47% than that of the noni juice, ripened noni juice, and fermented noni juice, respectively; the fermented noni beverage has a DPPH free radical scavenging capacity of 84.76%, which is increased by 84%, 34%, and 11% than that of the noni juice, ripened noni juice, and fermented noni juice, respectively; and the fermented noni beverage has a hydroxyl free radical scavenging activity of 94.41%, which is increased by 74%, 44%, and 17% than that of the noni juice, ripened noni juice, and fermented noni juice, respectively. It shows that natural ripening+*L. plantarum* fermentation greatly improves the AOC of the fermented noni beverage.

It can be seen from Table 1 that the fermented noni beverage has a lactic acid bacterium content of $3.875 \times 10^8$ CFU/mL, which is much higher than lactic acid bacterium contents of the noni juice, ripened noni juice, and fermented noni juice. It shows that natural ripening+*L. plantarum* fermentation greatly increases the viable *L. plantarum* content in the fermented noni beverage.

It can be seen from FIG. 1 to FIG. 4 that volatile components in the ripened noni juice and fermented noni beverage mainly include acids, phenols, and esters. Acids are the main source for an undesirable flavor, especially organic acids such as caproic acid and caprylic acid. However, compared with the ripened noni juice, the fermented noni beverage has significantly-reduced contents of volatile components such as caproic acid (reduced by 26%) and caprylic acid (reduced by 32%) that result in an undesirable flavor, but has greatly-increased contents of α-terpineol, methyl caprylate, and other volatile components that can bring fragrance. It shows that, compared with the ripened noni juice obtained from natural ripening alone, natural ripening+*L. plantarum* fermentation can greatly improve a flavor of the fermented noni beverage.

TABLE 1 pH, total acid content, total flavonoid content, T-AOC, DPPH free radical scavenging activity, hydroxyl free radical scavenging activity, and lactic acid bacterium content of the noni juice, ripened noni juice, fermented noni juice, and fermented noni beverage

|  | Noni juice | Ripened noni juice | Fermented noni juice | Fermented noni beverage |
|---|---|---|---|---|
| pH | 4.23 ± 0.155 | 3.90 ± 0.054 | 3.62 ± 0.225 | 3.50 ± 0.058 |
| Total acid content (mg/mL) | 7.99 ± 0.254 | 9.22 ± 0.201 | 10.34 ± 0.324 | 15.39 ± 0.383 |
| Total flavonoid content (mg/mL) | 0.18 ± 0.026 | 0.39 ± 0.008 | 0.41 ± 0.042 | 0.54 ± 0.027 |
| T-AOC (%) | 1.23 ± 0.081 | 1.09 ± 0.073 | 1.24 ± 0.094 | 1.82 ± 0.136 |
| DPPH free radical scavenging activity (%) | 46.00 | 63.47 | 76.20 | 84.76 |
| Hydroxyl free radical scavenging activity (%) | 54.25 | 65.38 | 80.76 | 94.41 |
| Lactic acid bacterium content (CFU/mL) | $2.321 \times 10^2$ | $3.673 \times 10^3$ | $2.352 \times 10^6$ | $3.875 \times 10^8$ |

Example 2: Preparation of a Fermented Red Raspberry Beverage

Fresh and undamaged red raspberry is taken and washed until the surface is clean, air-dried, and immediately put into a sealed aseptic glass jar, and natural ripening is conducted at 25° C. for 7 days to obtain ripened red raspberry; the ripened red raspberry is put into an aseptic bag, and a beating machine is used to beat and homogenize the ripened red raspberry to obtain a ripened red raspberry puree; the *L. plantarum* 22703 bacterial solution is inoculated into the ripened red raspberry puree at an inoculation amount of 2.5% (v/v), and fermentation is conducted at 25° C. for 16 days under aseptic conditions to obtain a fermented red raspberry puree; and the fermented red raspberry puree is centrifuged at 3,000 r/min until a clear supernatant is obtained, namely, a fermented red raspberry beverage.

The pH, total acid content, total flavonoid content, AOC (T-AOC, DPPH free radical scavenging activity, and hydroxyl free radical scavenging activity), and lactic acid bacterium content are detected for the fermented red raspberry beverage, and the types and contents are analyzed for volatile components in the fermented red raspberry beverage.

Detection results: the fermented red raspberry beverage has a pH of 3.28±0.037 (which is reduced by 8% than that of a ripened red raspberry juice obtained from natural ripening alone), a total acid content of 17.39±0.364 mg/mL (which is increased by 72% than that of the ripened red raspberry juice obtained from natural ripening alone), a total flavonoid content of 0.834±0.158 mg/mL (which is increased by 13.75% than that of the ripened red raspberry juice obtained from natural ripening alone), a T-AOC of 1.62±0.084 mM (which is increased by 58.64% than that of the ripened red raspberry juice obtained from natural ripening alone), a DPPH free radical scavenging activity of 67.76% (which is increased by 42% than that of the ripened red raspberry juice obtained from natural ripening alone), a hydroxyl free radical scavenging activity of 82.45% (which is increased by 37% than that of the ripened red raspberry juice obtained from natural ripening alone), and a lactic acid bacterium content of $4.463 \times 10^7$ CFU/mL.

Volatile components in the fermented red raspberry beverage mainly include small-molecule alkanes, unsaturated aldehydes, ketones, fatty acids, and terpenoids, which generally include unsaturated groups, have relatively-active chemical properties, can participate in a free radical-mediated oxidation reaction to realize the resistance to free radical oxidation, and have antibacterial activity. It shows that natural ripening+*L. plantarum* fermentation can greatly improve the AOC of the fermented red raspberry beverage, and can also endow the fermented red raspberry beverage with certain antibacterial ability.

Example 3: Preparation of a Fermented Green Radish Beverage

Fresh and undamaged green radish is taken and washed until the surface is clean, air-dried, and immediately put into a sealed aseptic glass jar, and natural ripening is conducted at 25° C. for 7 days to obtain ripened green radish; the ripened green radish is put into an aseptic bag, and a beating machine is used to beat and homogenize the ripened green radish to obtain a ripened green radish puree; the *L. plantarum* 22703 bacterial solution is inoculated into the ripened green radish puree at an inoculation amount of 2.5% (v/v), and fermentation is conducted at 25° C. for 16 days under aseptic conditions to obtain a fermented green radish puree; and the fermented green radish puree is centrifuged at 3,000 r/min until a clear supernatant is obtained, namely, a fermented green radish beverage.

The pH, total acid content, total flavonoid content, AOC (T-AOC, DPPH free radical scavenging activity, and hydroxyl free radical scavenging activity), and lactic acid bacterium content are detected for the fermented green radish beverage, and the types and contents are analyzed for volatile components in the fermented green radish beverage.

Detection results: the fermented green radish beverage has a pH of 3.57±0.116 (which is reduced by 10% than that of a ripened green radish juice obtained from natural ripening alone), a total acid content of 12.62±0.224 mg/mL (which is increased by 14% than that of the ripened green radish juice obtained from natural ripening alone), a total flavonoid content of 0.568±0.006 mg/mL (which is increased by 10.72% than that of the ripened green radish juice obtained from natural ripening alone), a T-AOC of 1.925±0.262 mg/mL (which is increased by 58.78% than that of the ripened green radish juice obtained from natural ripening alone), a DPPH free radical scavenging activity of 73.36% (which is increased by 38% than that of the ripened green radish juice obtained from natural ripening alone), a hydroxyl free radical scavenging activity of 65.59% (which is increased by 47% than that of the ripened green radish juice obtained from natural ripening alone), and a lactic acid bacterium content of $1.378×10^8$ CFU/mL.

Volatile components in the ripened green radish juice and fermented green radish beverage mainly include esters, thioethers, and olefins. A large amount of pentyl isothiocyanate, hexyl isothiocyanate, and other esters that can bring the pungent taste of green radish can be detected in the ripened green radish juice. However, compared with the ripened green radish juice, in the fermented green radish beverage, the pentyl isothiocyanate, hexyl isothiocyanate, and other esters that can bring the pungent taste of green radish cannot be detected. It shows that natural ripening+*L. plantarum* fermentation can greatly improve a flavor of the fermented green radish beverage.

Although the present invention has been disclosed with preferred examples, these examples shall not be construed as limiting the present invention. Any person skilled in the art may make various changes and modifications without departing from the spirit and scope of the present invention. The present invention shall fall within the protection scope defined in the following claims.

What is claimed is:

1. A method for preparing a fermented beverage, comprising in the following order:
    performing a natural ripening on a fruit and/or a vegetable at 15° C. to 30° C. for 5 days to 10 days to obtain a ripened fruit and/or a ripened vegetable;
    inoculating lactic acid bacteria into the ripened fruit and/or the ripened vegetable to obtain an inoculated fruit and/or an inoculated vegetable, and
    performing a fermentation on the inoculated fruit and/or the inoculated vegetable for 10 days to 30 days at 15° C. to 30° C. to obtain the fermented beverage,
    wherein the fermented beverage comprises fermented noni beverage having a lactic acid wherein the fruit comprises noni fruit, and bacterium content of $1×10^8$ to $1×10^9$ CFU/mL.

2. The method for preparing the fermented beverage according to claim 1, wherein the method comprises:
    performing the natural ripening on the fruit and/or the vegetable at 15° C. to 30° C. for 5 days to 10 days to obtain the ripened fruit and/or the ripened vegetable;
    beating and homogenizing the ripened fruit and/or the ripened vegetable to obtain a ripened fruit puree and/or a ripened vegetable puree;
    inoculating the lactic acid bacteria into the ripened fruit puree and/or the ripened vegetable puree to obtain an inoculated fruit puree and/or an inoculated vegetable puree, and performing the fermentation on the inoculated fruit puree and/or the inoculated vegetable puree at 15° C. to 30° C. for 10 days to 30 days to obtain a fermented fruit puree and/or a fermented vegetable puree; and
    centrifuging the fermented fruit puree and/or the fermented vegetable puree to obtain a supernatant, wherein the supernatant is the fermented beverage.

3. The method for preparing the fermented beverage according to claim 1, wherein the method comprises:
    performing the natural ripening on the fruit and/or the vegetable at 25° C. for 5 days to 10 days to obtain the ripened fruit and/or the ripened vegetable;
    beating and homogenizing the ripened fruit and/or the ripened vegetable to obtain a ripened fruit puree and/or a ripened vegetable puree;
    inoculating the lactic acid bacteria into the ripened fruit puree and/or the ripened vegetable puree to obtain an inoculated fruit puree and/or an inoculated vegetable puree, and performing the fermentation on the inoculated fruit puree and/or the inoculated vegetable puree at 25° C. for 10 days to 30 days to obtain a fermented fruit puree and/or a fermented vegetable puree; and
    centrifuging the fermented fruit puree and/or the fermented vegetable puree to obtain a supernatant, wherein the supernatant is the fermented beverage.

4. The method for preparing the fermented beverage according to- claim 1, wherein the lactic acid bacteria are inoculated into the ripened fruit and/or the ripened vegetable at an amount of $1×10^5$ CFU/mL to $1×10^6$ CFU/mL.

5. The method for preparing the fermented beverage according to claim 1, wherein the natural ripening is conducted in an aseptic and airtight environment.

6. The method for preparing the fermented beverage according to claim 1, wherein the fermentation is conducted in an aseptic and airtight environment.

7. The method for preparing the fermented beverage according to claim 2, wherein the beating and homogenizing is conducted in an aseptic environment.

8. The method for preparing the fermented beverage according to claim 1, wherein the fruit and/or the vegetable is not crushed and/or sterilized.

9. A fermented noni beverage, wherein the fermented beverage is prepared using the method according to claim 1, wherein the fermented noni beverage has a total antioxidant capacity (T-AOC) of 1 mM to 3 mM, a diphenylpicrylhydrazyl (DPPH) free radical scavenging activity of 60%-95%, and a hydroxyl free radical scavenging activity of 60%-95%.

10. A food, comprising the fermented noni beverage according to claim 9.

11. The method for preparing the fermented beverage according to claim 2, wherein the method comprises:
    performing the natural ripening on the fruit and/or the vegetable at 25° C. for 5 days to 10 days to obtain the ripened fruit and/or the ripened vegetable;
    beating and homogenizing the ripened fruit and/or the ripened vegetable to obtain the ripened fruit puree and/or the ripened vegetable puree;
    inoculating the lactic acid bacteria into the ripened fruit puree and/or the ripened vegetable puree to obtain the inoculated fruit puree and/or the inoculated vegetable puree, and performing the fermentation on the inoculated fruit puree and/or the inoculated vegetable puree at 25° ° C. for 10 days to 30 days to obtain the fermented fruit puree and/or the fermented vegetable puree; and
    centrifuging the fermented fruit puree and/or the fermented vegetable puree to obtain the supernatant, wherein the supernatant is the fermented beverage.

12. The method for preparing the fermented beverage according to claim 2, wherein the lactic acid bacteria are inoculated into the ripened fruit puree and/or the ripened vegetable puree at an amount of $1×10^5$ CFU/mL to $1×10^6$ CFU/mL.

13. The method for preparing the fermented beverage according to claim 3, wherein the lactic acid bacteria are inoculated into the ripened fruit puree and/or the ripened vegetable puree at an amount of $1\times10^5$ CFU/mL to $1\times10^6$ CFU/mL.

14. The method for preparing the fermented beverage according to claim 2, wherein the natural ripening is conducted in an aseptic and airtight environment.

15. The method for preparing the fermented beverage according to claim 3, wherein the natural ripening is conducted in an aseptic and airtight environment.

16. The method for preparing the fermented beverage according to claim 4, wherein the natural ripening is conducted in an aseptic and airtight environment.

17. The method for preparing the fermented beverage according to claim 2, wherein the fermentation is conducted in an aseptic and airtight environment.

18. The method for preparing the fermented beverage according to claim 3, wherein the fermentation is conducted in an aseptic and airtight environment.

19. The method for preparing the fermented beverage according to claim 4, wherein the fermentation is conducted in an aseptic and airtight environment.

20. The method for preparing the fermented beverage according to claim 1, wherein the fermented noni beverage has a total antioxidant capacity (T-AOC) of 1 mM to 3 mM, a diphenylpicrylhydrazyl (DPPH) free radical scavenging activity of 60%-95%, and a hydroxyl free radical scavenging activity of 60%-95%.

\* \* \* \* \*